US008654793B2

(12) United States Patent
Rim et al.

(10) Patent No.: US 8,654,793 B2
(45) Date of Patent: Feb. 18, 2014

(54) NETWORK DEVICE FOR SHARING MULTIMEDIA DATA WITH OTHER NETWORK DEVICES EXISTING ON NETWORK AND METHOD THEREFOR

(75) Inventors: Dae-hak Rim, Seoul (KR); Kwang-yun Na, Yongin-si (KR); Eun-hee Rhim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1852 days.

(21) Appl. No.: 11/512,099

(22) Filed: Aug. 30, 2006

(65) Prior Publication Data

US 2007/0050500 A1 Mar. 1, 2007

(30) Foreign Application Priority Data

Aug. 31, 2005 (KR) .................. 10-2005-0080830

(51) Int. Cl.
*H04J 1/00* (2006.01)
(52) U.S. Cl.
USPC .......................................... 370/486
(58) Field of Classification Search
USPC .......................................... 370/486, 487, 260
See application file for complete search history.

(56) References Cited

U.S. PATENT DOCUMENTS

| 5,491,801 A | 2/1996 | Jain et al. | |
|---|---|---|---|
| 6,763,523 B1 * | 7/2004 | Sacilotto et al. | 725/91 |
| 2002/0180803 A1 * | 12/2002 | Kaplan et al. | 345/810 |
| 2003/0206554 A1 * | 11/2003 | Dillon | 370/432 |
| 2005/0002388 A1 * | 1/2005 | Gao | 370/389 |
| 2005/0076136 A1 * | 4/2005 | Cho et al. | 709/231 |
| 2005/0108430 A1 * | 5/2005 | Howarth et al. | 709/245 |
| 2005/0232242 A1 * | 10/2005 | Karaoguz et al. | 370/352 |
| 2005/0233742 A1 * | 10/2005 | Karaoguz et al. | 455/432.3 |
| 2005/0262530 A1 * | 11/2005 | Ruetschi et al. | 725/35 |
| 2006/0098664 A1 * | 5/2006 | De Dona | 370/401 |

FOREIGN PATENT DOCUMENTS

| EP | 1 139 635 A2 | 10/2001 |
|---|---|---|
| JP | 2003-030079 A | 1/2003 |
| JP | 2005-115453 A | 4/2005 |
| KR | 2000-0017754 A | 4/2000 |
| KR | 2003-0062863 A | 7/2003 |
| KR | 10-2004-0048363 A | 6/2004 |
| WO | 2004/097655 A1 | 11/2004 |

\* cited by examiner

*Primary Examiner* — Mark Rinehart
*Assistant Examiner* — Mohammad Anwar
(74) *Attorney, Agent, or Firm* — Sughrue Mion, PLLC

(57) ABSTRACT

Network devices and methods are provided for sharing multimedia data with other network devices existing on a network, in which a network device shares and uses multimedia data with other network devices, collects information about multimedia data contained in the other network devices and requests the transmission of multimedia data from a network device containing the multimedia data based on the collected information at the request of a user. The network device may include a network device management unit for collecting information about multimedia data; a multimedia data management unit for preparing a multimedia data list; a packet generation/processing unit for generating a packet requesting multimedia data; and a transmission unit for transmitting the generated packet to a specific network device.

26 Claims, 6 Drawing Sheets

FIG. 3A

| Classification | Title |
|---|---|
| 1 | The Matrix |
| 2 | Chicago |
| 3 | War Of The Worlds |
| 4 | Minority Report |
| 5 | Spirited Away |
| 6 | Love Letter |
| 7 | The Lord of The Rings |
| ... | ... |

FIG. 3B

| Classification | Title | Name of Network Device | Storage Location |
|---|---|---|---|
| 1 | The Matrix | first network device | 225.168.23.154 |
| 2 | Chicago | first network device | 225.168.23.154 |
| 3 | War of the Worlds | second network device | 225.192.124.100 |
| 4 | Minority Report | second network device | 225.192.124.100 |
| 5 | Spirited Away | third network device | 225.168.203.175 |
| 6 | Love Letter | third network device | 225.168.203.170 |
| 7 | The Lord of the Rings | fourth network device | 225.173.187.130 |
| ... | ... | ... | ... |

NETWORK DEVICE FOR SHARING MULTIMEDIA DATA WITH OTHER NETWORK DEVICES EXISTING ON NETWORK AND METHOD THEREFOR

CROSS-REFERENCE TO RELATED APPLICATION

This application claims priority from Korean Patent Application No. 10-2005-0080830 filed on Aug. 31, 2005 in the Korean Intellectual Property Office, the disclosure of which is incorporated herein in its entirety by reference.

BACKGROUND OF THE INVENTION

1. Field of the Invention

Apparatuses and methods consistent with the present invention relate to sharing multimedia data among network devices existing on a network and, more particularly, to network devices and methods for sharing and using multimedia data with other network devices existing on a network, which collect information about multimedia data contained in the other network devices and request the transmission of multimedia data from a network device containing the multimedia data based on the collected information at the request of a user.

2. Description of the Related Art

As operating systems such as Microsoft Windows XP have incorporated Universal Plug and Play (UPnP), research into network environments employing UPnP has been actively conducted. Conventional Plug and Play refers to technology in which a Personal Computer (PC) detects and automatically installs drivers for peripheral devices when the peripheral devices are installed in the PC.

UPnP is an architecture that may be universally used to expand Plug and Play to an entire network and automatically connect devices on a network in a Peer-to-Peer (P2P) manner. UPnP automatically connects devices on a network based on Internet standards, such as Transmission Control Protocol/Internet Protocol (TCP/IP), the Hyper Text Transfer Protocol (HTTP), and Extensible Markup Language (XML).

Currently, as the number of available multimedia data storage devices, such as portable devices and Personal Computers (PCs), increases within homes, a device that enables a user to efficiently manage and use multimedia data at several locations on a home network is required.

However, in the UPnP standard established in the UPnP forum (www.upnp.org), there is a problem in that no method of enabling a user to transmit and receive multimedia data between network devices has yet been provided.

Meanwhile, in a network in which a plurality of devices exists, when information about desired content is requested, a content requester is connected to a server, is authenticated through a member DataBase (DB), and is provided with content information, found in a content DB, through a main server.

Since all of the pieces of connection and characteristic content information are managed and controlled by a server, a problem occurs in that overload may occur when specific content is requested and retrieved.

Korean Unexamined Patent Publication No. 10-2003-75821, entitled "Content Sharing System", discloses a system for sharing content, in which content provided by a head office is linked to from the website of a branch office in real time, the branch office freely selects content from a content DB established by the head office and efficiently arranges and provides the selected content on the website of the branch office, thereby promoting use by the members thereof. Further, the system automatically checks records of content usage by the members and creates a log file so that benefits generated by the members who use the content through the website of the branch office are clearly divided between the head office and the branch office in a certain ratio. However, since the provision of the information is performed through the website using website-based technology, it is difficult to re-process the information. Furthermore, related technology is based on a server, so that it cannot be used in an environment in which there is no server. The content is managed in a centralized manner, and, therefore, the entire network load is concentrated on a server, so that it is difficult to manage traffic.

Therefore, technology, in which a plurality of network devices existing on a network all share information about multimedia data (i.e., content information) and, when specific multimedia data is desired to be used, a network device directly requests it from a corresponding network device based on the shared information, is required.

SUMMARY OF THE INVENTION

Exemplary embodiments of the present invention may overcome the above disadvantages and other disadvantages not described above. The present invention is not necessarily required to overcome any of the disadvantages described above, and the exemplary embodiments of the present invention may not overcome any of the problems described above. The appended claims should be consulted to ascertain the true scope of the invention.

The present invention provides a network device and method for conveniently sharing of multimedia data among network devices by collecting information about multimedia data contained in a plurality of network devices, and requesting transmission of corresponding multimedia data from a network device containing the corresponding multimedia data based on the collected information at the request of a user.

The present invention may prevent the concentration of a load on a specific network device by allowing each of the network devices existing on a network to act as both a server for requesting multimedia data and as a client for providing multimedia data.

The present invention may also allow a user to be conveniently provided with multimedia data by providing a list of multimedia data contained in network devices existing on a network.

According to an aspect of the present invention, there is provided a network device for sharing multimedia data with other network devices existing on a network, the network device including a network device management unit which collects information about multimedia data from the other network devices; a multimedia data management unit which prepares a multimedia data list based on the collected information about the multimedia data on the other network devices and information about multimedia data on the network device; a packet generation/processing unit which generates a packet requesting selected multimedia data on the multimedia data list; and a transmission unit which transmits the generated packet which requests multimedia data to at least one of the other network devices existing on the network.

According to another aspect of the present invention, there is provided a method in which a network device shares multimedia data with other network devices existing on a network, the method including collecting information about multimedia data from the other network devices; preparing a multimedia data list based on the collected information about the multimedia data on the other network devices and information about multimedia data on the network device; generating a packet which requests selected multimedia data of the multimedia data list; and transmitting the generated packet to at least one of the other network devices.

The method may further include receiving the multimedia data which is requested from the at least one of the other network devices and playing the multimedia data that is received.

BRIEF DESCRIPTION OF THE DRAWINGS

The above and other aspects of the present invention will be more clearly understood from the following detailed description of exemplary embodiments taken in conjunction with the accompanying drawings, in which:

FIGS. 3A and 3B are diagrams respectively illustrating a multimedia data list and a mapping table prepared by the multimedia data information management unit of a network device for sharing multimedia data with other network devices existing on a network, according to an exemplary embodiment of the present invention;

DETAILED DESCRIPTION OF THE EXEMPLARY EMBODIMENTS OF THE PRESENT INVENTION

Figure 1:
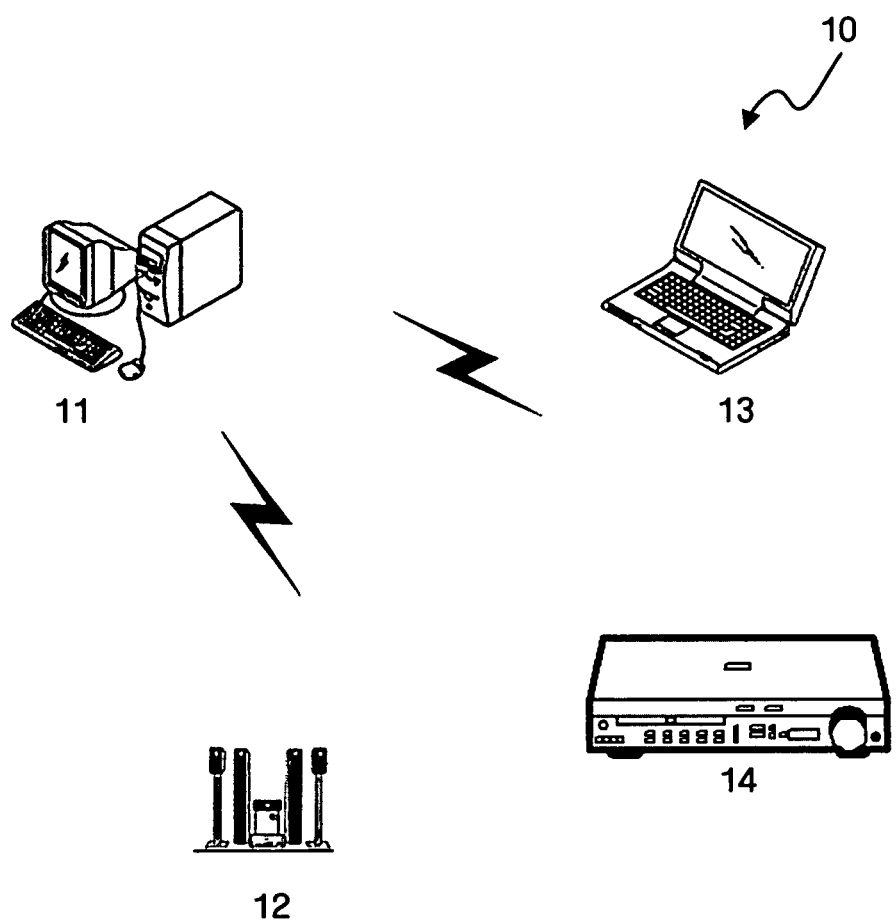
FIG. 1 is a diagram illustrating a network system in which network devices existing on a network share multimedia data, according to an exemplary embodiment of the present invention.

Reference is now made to the drawings, in which the same reference numerals are used throughout the different drawings to designate the same or similar components.

Exemplary embodiments of the present invention are described in below with reference to the drawings of block diagrams and flowcharts illustrating a network device of sharing multimedia data with other network devices existing on a network and a method therefore. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order shown. For example, two blocks shown in succession may in fact be executed substantially concurrently or the blocks may sometimes be executed in the reverse order, depending upon the functionality involved.

FIG. 1 is a diagram illustrating a network system in which network devices existing on a network share multimedia data, according to an exemplary embodiment of the present invention.

As illustrated in FIG. 1, a plurality of network devices 10, i.e., devices 11, 12, 13 and 14, exist on a network. The network devices 10 are hosts or devices using the TCP/IP protocol, and may store multimedia data and metadata of the multimedia data, and display multimedia data. For example, the network devices 10 may include desktops, notebooks, home theaters and Personal Video Recorders (PVRs). Furthermore, the multimedia data is data representing information, such as characters, still images, sound, animation and moving images.

In an exemplary embodiment of the present invention, each of the network devices 10 acts both as a server for requesting multimedia data from other network devices and displaying it, and as a client for receiving a packet requesting predetermined multimedia data from a specific network device and providing its own multimedia data. In this case, the following description is given under the assumption that a first network device 11 acts as a server for requesting predetermined multimedia data from the other network devices 12, 13 and 14.

First, after being turned on, the first network device 11 collects information about the other network devices 12, 13 and 14 existing on a network. At this time, the first network device 11 transmits a packet that requests information from the other network devices 12, 13 and 14 in a multicast or broadcast manner. The information requested from the network devices 12, 13 and 14 refers to information about the devices (e.g., the names and IP addresses of the devices), and information about multimedia data stored in them.

Next, the first network device 11 prepares a list of multimedia data existing on the network based on information about multimedia data transmitted from the other network devices 12, 13 and 14, and information about the multimedia data stored in the requesting network device itself (i.e., the first network device).

Thereafter, the first network device 11 prepares a mapping table, in which the titles of the multimedia data and the names and addresses of the network devices containing multimedia data are mapped to each other, based on the prepared multimedia data list. In this case, the multimedia data list is prepared for the provision of multimedia data (i.e., available multimedia data) existing on the network to a user, and the mapping table is prepared for the request of corresponding multimedia data from the network devices containing multimedia data selected by a user.

The first network device 11 displays the prepared multimedia data list on a display screen at the request of a user, checks the title and storage location of the multimedia data based on the mapping table when predetermined multimedia data is selected by the user, and searches for a network device (e.g., a second network device 12) containing the corresponding multimedia data.

Next, the first network device 11 transmits a packet requesting the transmission of the multimedia data to the second network device 12 containing the corresponding multimedia data in a unicast manner. Then, the second network device 12 receives the packet requesting the transmission of the predetermined multimedia data from the first network device, examines the data contained by second network device 12 itself to determine whether the requested multimedia data exists thereon, generates a response packet including the multimedia data that is requested, and transmits it to the first network device 11.

The first network device 11 displays the multimedia data transmitted by the second network device 12 on a display screen.

As a result, the user is provided with the list of multimedia data existing on a network. When desired multimedia data does not exist in a network device (e.g., the first network device) currently used by the user, it can be provided by another network device (for example, the second network device) that does contain the desired multimedia data.

Figure 2:
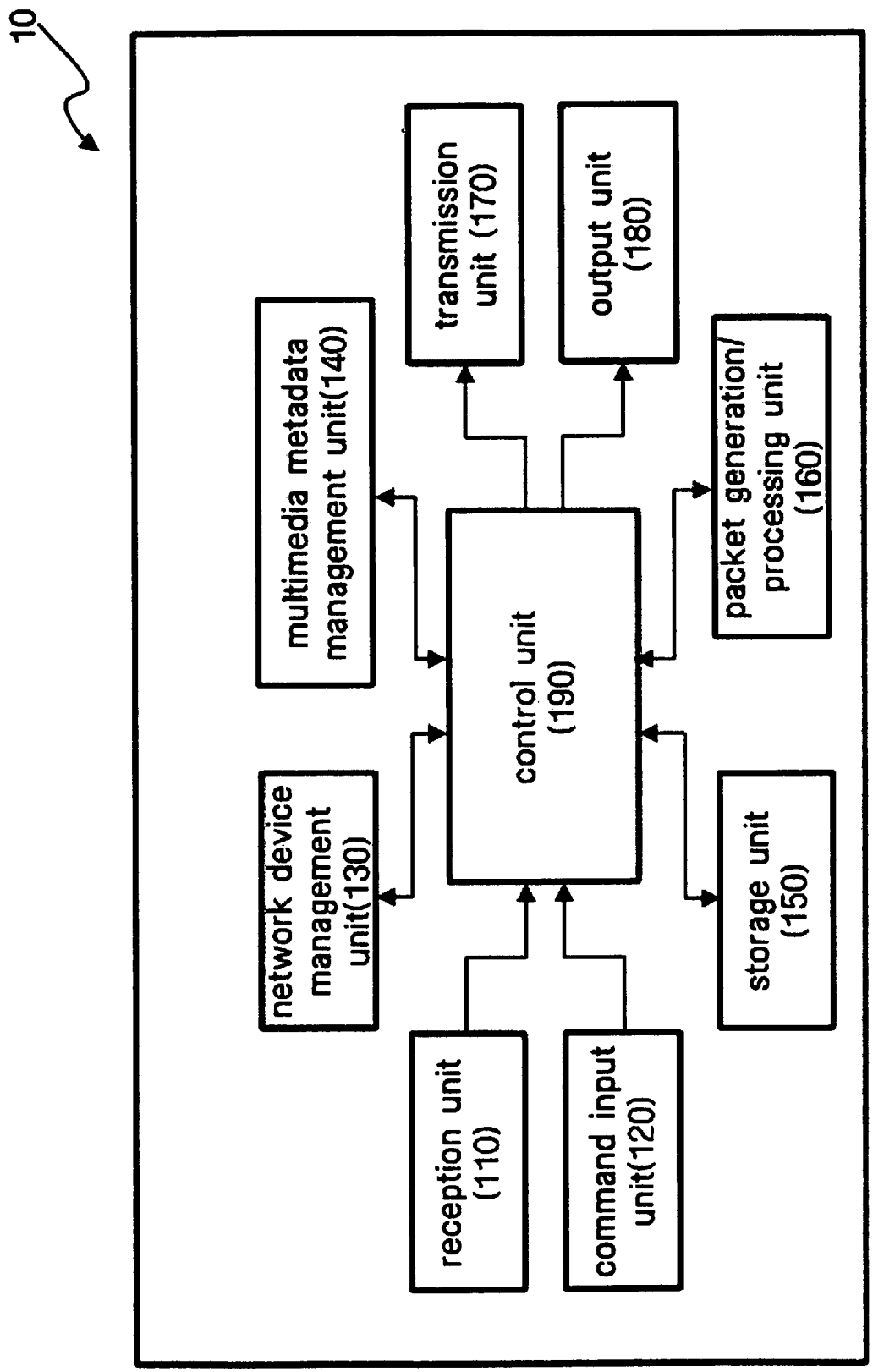
FIG. 2 is a block diagram illustrating the internal construction of a network device for sharing multimedia data with other network devices existing on a network, according to an exemplary embodiment of the present invention.

FIG. 2 is a block diagram illustrating the internal construction of a device for sharing multimedia data with the other network devices existing on a network, according to an exemplary embodiment of the present invention.

As illustrated in FIG. 2, the network device 10 includes a reception unit 110, a command input unit 120, a network device management unit 130, a multimedia data information management unit 140, a storage unit 150, a packet generation/processing unit 160, a transmission unit 170, an output unit 180 and a control unit 190.

The term "unit", as used herein, refers to, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

The command input unit 120 receives a command signal generated by a user. A user command may include a menu request command, a multimedia data selection command, and a function (e.g., a play function, a pause function, a fast-forward function, a reverse-play function or a volume control function) selection command.

The storage unit 150 stores multimedia data and metadata of the multimedia data.

The network device management unit 130 collects information about multimedia data from a plurality of network devices existing on a network. For instance, the network device management unit 130 may examine information about surrounding network devices at the time of being turned on by a user or at some other specified time. Therefore, the surrounding network devices receive a packet that requests information from a specific network device, and transmit information about a device and multimedia data to the corresponding device.

Furthermore, the network device management unit 130 is provided with varied information transmitted from the network devices, and transmits the varied information to the multimedia data information management unit 140. The multimedia data information management unit 140 updates previously stored information using the varied information.

For example, once the first network device 11 is turned on, the first network device 11 requests information, such as information about a device and multimedia data, from the surrounding network devices 12, 13 and 14 through an information request packet. The network device management unit 130 collects information (e.g., information about a device and multimedia data) transmitted from the surrounding network devices 12, 13 and 14.

The multimedia data information management unit 140 prepares a multimedia data list based on the information about the multimedia data of the network devices collected by the network device management unit 130, and information about the multimedia data stored in the storage unit 150.

Furthermore, the multimedia data information management unit 140 prepares a mapping table, in which the titles of multimedia data and the names and addresses of network devices containing the multimedia data are mapped to each other, based on the multimedia data list that is prepared. The multimedia data list and the mapping table are described below with reference to FIGS. 3A and 3B.

For example, if it is assumed that the first network device 11 receives information indicating that the second network device 12 contains the movie files "War of the Worlds" and "Minority Report" from the second network device 12, information indicating that a third network device 13 contains the movie files "Spirited Away" and "Love Letter" from the third network device 13, and information indicating that a fourth network device 14 contains the movie files "Lord of the Rings" from the fourth network device 14, and the movie files "The Matrix" and "Chicago" are stored in its storage unit 150, the multimedia data information management unit 140 prepares the multimedia data list illustrated in FIG. 3A.

Next, the first network device 11 prepares a mapping table in which the titles of multimedia data and the names and addresses of network devices containing the multimedia data are mapped to each other, based on the multimedia data list that is prepared (see FIG. 3B).

Meanwhile, the first network device 11 displays the prepared multimedia data list on a display screen at the request of a user. In this case, the multimedia data list may be provided alone on the screen, or may be provided along with additional information, such as the names and locations of network devices containing multimedia data, which may be stored in the mapping table.

The packet generation/processing unit 160 analyzes a packet transmitted through the control unit 190, and generates a packet requesting multimedia data or a packet requesting predetermined information according to the type of the packet being analyzed.

The operation of the packet generation/processing unit 160 is described in detail with reference to FIG. 4.

Figure 4:
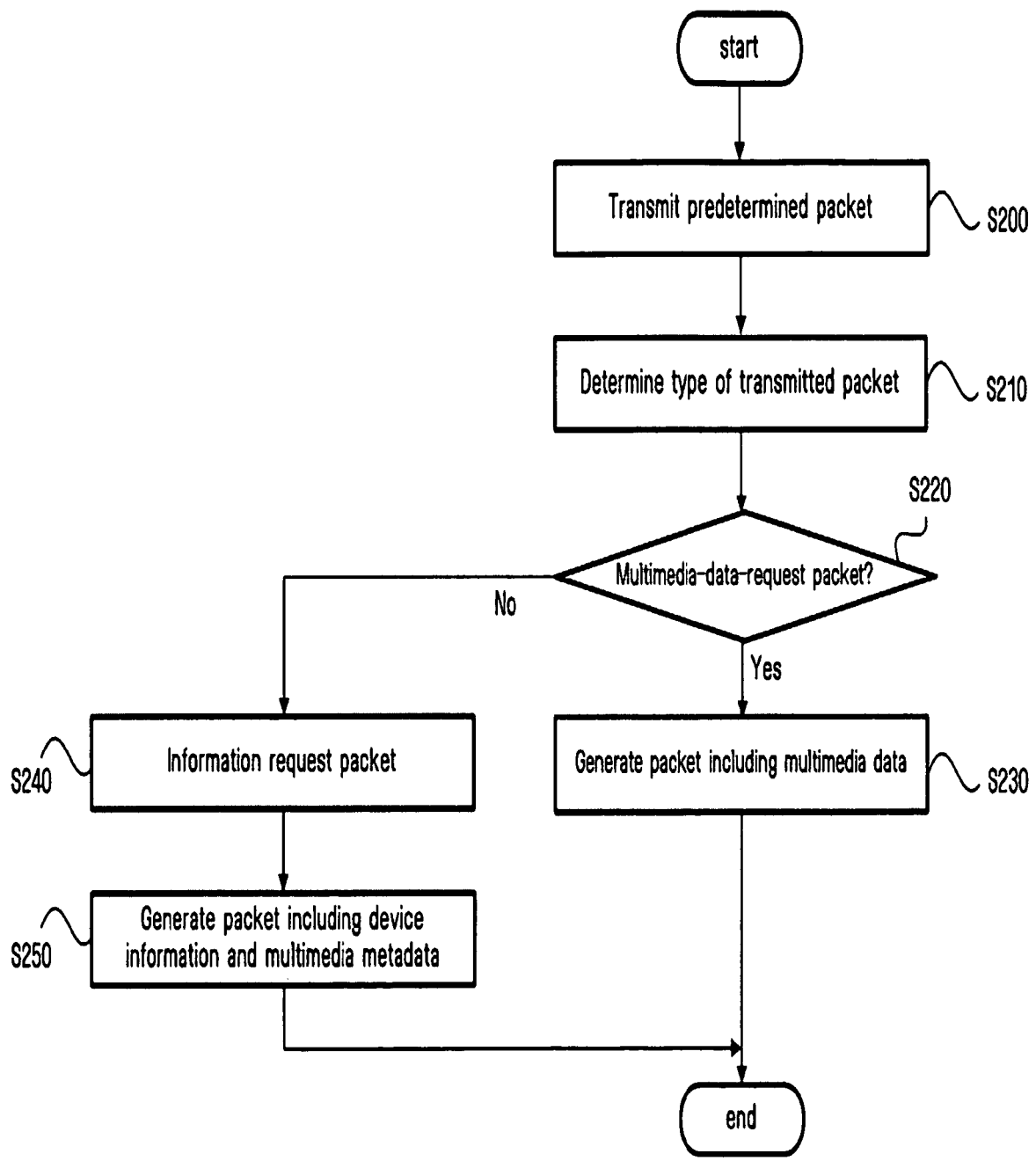
FIG. 4 is a diagram illustrating the operation of a packet generation/processing unit for receiving a packet in a method of sharing multimedia data between network devices existing on a network according to another exemplary embodiment of the present invention.

As illustrated in FIG. 4, when a predetermined packet is transmitted through the control unit 190 at operation S200, the packet generation/processing unit 160 examines the transmitted packet and examines the type of packet at operation S210.

If, as a result of the determination, the transmitted packet is determined to be a packet requesting multimedia data at operation S220, the packet generation/processing unit 160 generates a packet including the requested multimedia data at operation S230.

Meanwhile, if, as a result of the determination, the transmitted packet is a packet requesting predetermined information at operation S240, the packet generation/processing unit 160 generates a packet including information about a device and multimedia data at operation S250.

For example, if the transmitted packet is a packet requesting predetermined multimedia data (for example, the movie file "War of the Worlds"), the packet generation/processing unit 160 generates a packet including information about the location of the file "War of the Worlds" and the request for the "War of the Worlds" file transmitted from the multimedia data information management unit 140.

The transmission unit 170 transmits the packet generated by the packet generation/processing unit 160 to a plurality of network devices existing on a network. At this time, if the packet is a packet requesting multimedia data, the transmission unit 170 transmits the packet to a corresponding network device in a unicast manner. If the packet is a packet requesting information about devices and multimedia data, the transmission unit 170 transmits it to network devices in a multicast or unicast manner.

The reception unit 110 receives the information request packet transmitted from a network device in a multicast manner (or a broadcast manner), and the packet including multimedia data transmitted from a network device in a unicast manner.

The output unit 180 outputs the multimedia data list prepared by the multimedia data information management unit 140, or multimedia data selected by a user, on a display screen.

Meanwhile, the output unit 180 may or may not be provided depending on the type of network device 10. For example, if the network device 10 is a device that includes a display, such as a desktop or a notebook computer, the network device 10 would include output unit 180 for outputting multimedia data. However, if the network device 10 is a device that does not include a display, such as a personal video recorder (PVR), the network device 10 does not include the output unit 180.

The control unit 190 controls the overall operation of a network device. Once a network device (e.g., a first network device) is turned on, the control unit 190 controls the network management unit 130 to collect information about all of the other network devices (e.g., the second to fourth network devices).

Furthermore, the control unit 190 transmits the information that is collected to the multimedia data information management unit 140, and controls the multimedia data information management unit 140 to prepare a multimedia data list.

The control unit 190 also controls the multimedia data information management unit 140 to search for multimedia data selected by a user through the command input unit 120 and examine information about the location thereof.

The control unit 190 further controls the packet generation/processing unit 160 to generate a packet that requests the multimedia data from a predetermined network device, and the transmission unit 170 to transmit the generated packet.

Furthermore, when multimedia data is received through the reception unit 110, the control unit 190 controls the output unit 180 to output the multimedia data that is received.

Therefore, the network device 10 in accordance with an exemplary embodiment of the present invention collects information about multimedia data, provides a multimedia data list, searches a network device containing multimedia data that is selected by a user, and transmits a packet requesting the multimedia data to all network devices existing on a network, so that the network device which requests the multimedia data can provide the multimedia data to the user.

That is, each of the network devices act both as a server for searching for and requesting multimedia data and as a client for receiving a packet requesting predetermined multimedia data from a predetermined network device and providing its own multimedia data, so that the concentration of load on a specific network device is prevented from occurring.

Figure 5:
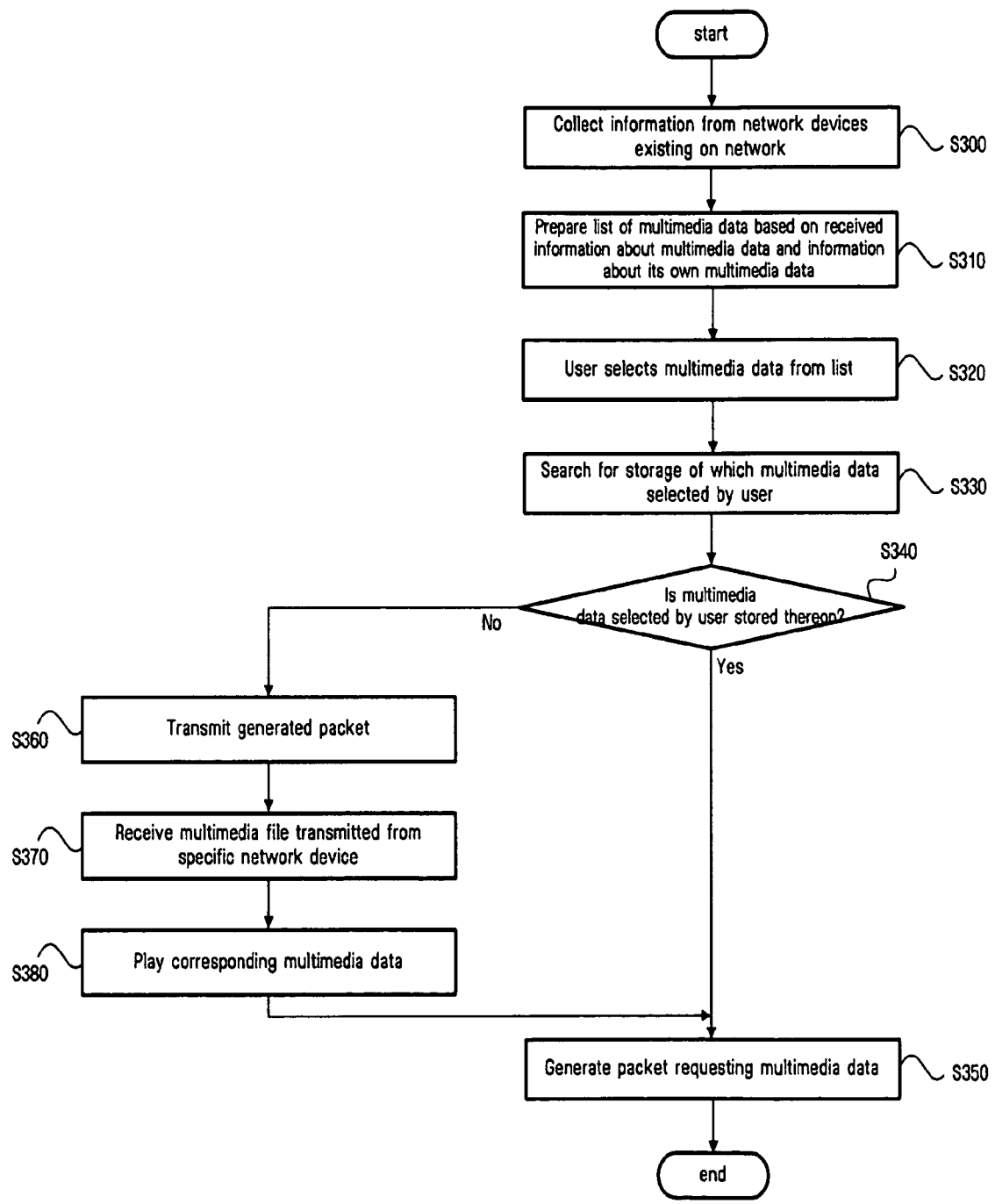
FIG. 5 is a diagram illustrating a method of sharing multimedia data between network devices existing on a network according to an exemplary embodiment of the present invention.

FIG. 5 is a diagram illustrating a method of sharing multimedia data between network devices existing on a network according to an exemplary embodiment of the present invention. In this figure, it is assumed that a first network device 11 acts as a server for requesting multimedia data from the other network devices 12, 13 and 14. Furthermore, it is assumed that the first network device 11 includes a display apparatus capable of providing predetermined multimedia data.

First, once the first network device 11 is turned on, the first network device 11 collects information about a device and multimedia data from the other network devices 12, 13 and 14 at operation S300. At this time, the control unit 190 controls the packet generation/processing unit 160 to generate an information request packet, and the transmission unit 170 transmits the generated packet in a multicast manner (or a broadcast manner). Accordingly, the network devices that receive the information request packet transmit a response packet including information about a device and multimedia data, so that the network device management unit 130 collects the information about a device and multimedia data.

Thereafter, the control unit 190 transmits the collected information about a device and multimedia data to the multimedia data information management unit 140. The multimedia data information management unit 140 prepares a multimedia data list based on the transmitted information about multimedia data and information about its own multimedia data (i.e., the multimedia data of the first network device) stored in the storage unit 150. In this case, the multimedia data information management unit 140 prepares a mapping table in which the titles of multimedia data, and the names and addresses of the network devices containing the multimedia data are mapped to each other, based on the prepared multimedia data list (see FIG. 3).

Thereafter, when a request for the multimedia data list is input through the command input unit 120, the control unit 190 controls the output unit 180 to display the prepared multimedia data list on a display screen.

If the user selects specific multimedia data (e.g., the movie file "The Matrix") in the displayed multimedia data list at operation S320, the command input unit 120 receives a selection signal generated by the user and transmits it to the control unit 190.

Then, the control unit 190 informs the multimedia data management unit 140 of the presence of the selected multimedia data. The multimedia data management unit 140 searches the prepared mapping table and examines information about the location of the multimedia data (in this example, the movie file "The Matrix") at operation S330.

If, as a result of the examination, the file "The Matrix" is determined to be stored therein (i.e., stored in the first network device) at operation S340, the control unit 190 controls the output unit 180 to play the file "The Matrix" stored in the storage unit 150 on a screen at operation S350.

Meanwhile, if, as a result of the examination, the multimedia data (the file "The Matrix") is determined to be located in another network device (e.g., the second network device), the control unit 190 controls the packet generation/processing unit 160 to generate a multimedia data request packet at operation S360.

The generated multimedia data request packet is transmitted to the corresponding network device (e.g., the second network device) through the transmission unit 170 at operation S370. Then, when a response packet including data of the file "The Matrix" is received from the second network device through the reception unit 110 at operation S380, the control unit 190 controls the output unit 180 to play the received file "The Matrix" on the screen.

As a result, the user can conveniently use multimedia data that exists on a network by collecting information about multimedia data contained in network devices connected to the network, examining the storage location of the multimedia data selected by a user, immediately playing the multimedia data if the corresponding multimedia data is stored therein, and requesting the multimedia data from a corresponding network device and playing it if the multimedia data is stored in another network device.

Furthermore, each of the network devices can act as both a server and a client, which can avoid the load being concentrated on a specific network device.

Figure 6:
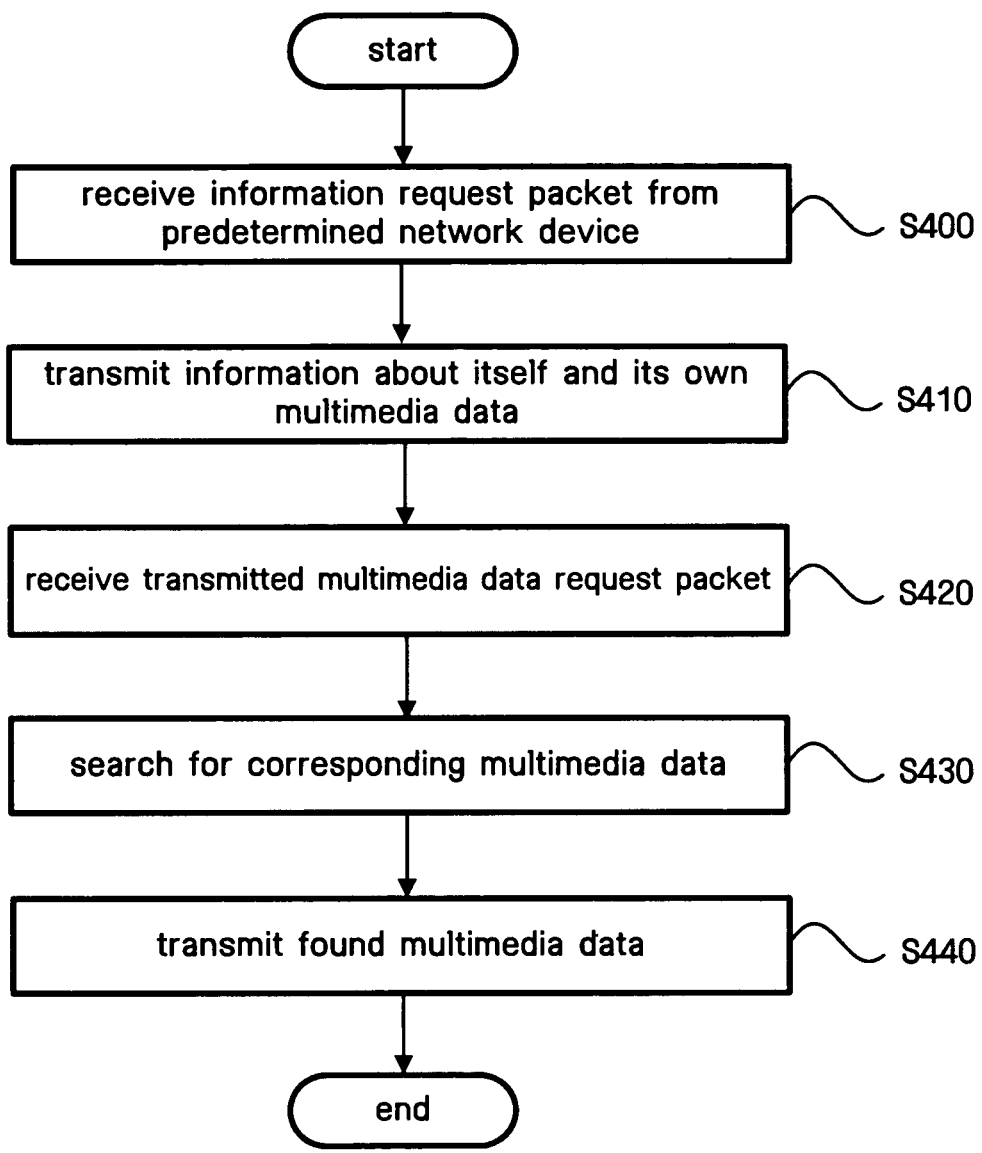
FIG. 6 is a flowchart illustrating the operation of a network device for providing information about predetermined multimedia data in a method of sharing multimedia data between network devices existing on a network according to another exemplary embodiment of the present invention.

FIG. 6 is a flowchart illustrating the operation of a network device for providing information about predetermined multimedia data in a method of sharing multimedia data between network devices according to another exemplary embodiment of the present invention. In this case, it is assumed that the first network device 11 requests multimedia data and the second network device 12 receives a request packet from the first network device 11.

As illustrated in FIG. 6, when the second network device 12 receives an information request packet from the first network device 11 at operation S400, the packet generation/processing unit 160 of the second network device 12 examines the type of transmitted packet.

If, as a result of the examination, the transmitted packet is determined to be a packet requesting information about a device and multimedia data, the second network device 12 generates a packet including information about a device and its own multimedia data and transmits it to the first network device 11 at operation S410.

Next, when a packet requesting predetermined multimedia data (e.g., the file "The Matrix") is received from the first network device 11 at operation S420, the second network device 12 searches the storage unit 150 for the file "The Matrix" at operation S430, generates a packet including the found file "The Matrix" through the packet generation/processing unit 160, and transmits it to the first network device 11 at operation S440.

As a result, each of the network devices existing on a network provides information about itself and its own multimedia data in response to an information request packet transmitted by any specific network device, and, when a packet requesting predetermined multimedia data is received from any specific network device, each of the network devices transmits the multimedia data, so that a plurality of network devices existing on a network can rapidly and conveniently share multimedia data.

Further, each of the network devices existing on the network can share information about its own multimedia data and also request desired multimedia data, based on the shared information, so that multimedia data not stored therein can be also accessed from other network devices.

Furthermore, each network device can act both as a server and as a client, so that the problem of load concentration on one network device can be resolved.

Furthermore, variation in predetermined information (information about multimedia data stored in each network device) is continually examined, so that the information can be updated immediately when the information varies.

Although exemplary embodiments of the present invention have been disclosed for illustrative purposes, those skilled in the art will appreciate that various modifications, additions and substitutions are possible, without departing from the scope and spirit of the invention as defined by the accompanying claims and equivalents thereof.

What is claimed is:

1. A network device for sharing multimedia data with other network devices existing on a network, the network device comprising:
   a network device management unit which collects information about multimedia data from the other network devices, the information including identification information of the other network devices at which a corresponding piece of the multimedia data is stored;
   a storage unit which stores multimedia data of the network device;
   a multimedia data management unit which prepares a multimedia data list based on the collected information about the multimedia data on the other network devices and information about the multimedia data which are stored on the network device;
   a packet generation/processing unit which generates a packet requesting selected multimedia data on the multimedia data list; and
   a transmission unit which transmits the generated packet to at least one of the other network devices existing on the network,
   wherein the network device comprises a client device.

2. The network device as set forth in claim 1, further comprising:
   a command input unit which receives a selection command; and
   an output unit which outputs the multimedia data list and the selected multimedia data according to the selection command to a display.

3. The network device as set forth in claim 1, wherein the network device management unit determines whether the information about the multimedia data on the other network devices varies.

4. The network device as set forth in claim 1, wherein the multimedia data information management unit generates a mapping table in which the multimedia data list and the information which is collected about the multimedia data are mapped to each other.

5. The network device as set forth in claim 4, wherein the network device transmits multimedia data to at least one of the other network devices in response to a request for a multimedia file stored on the network device.

6. The network device as set forth in claim 1, wherein the transmission unit requests the information about the multimedia data from the other network devices in a multicast or a broadcast manner.

7. The network device as set forth in claim 1, wherein the network device receives the multimedia data that is requested from the at least one of the other network devices.

8. The network device as set forth in claim 1, wherein the network device is connected to the other network devices via the network and the multimedia data which is requested from the at least one of the other network devices is transmitted to the network device via the network.

9. The network device as set forth in claim 1, wherein the network device management unit discovers the identification information related to the other network devices, which exist on the network, and sends a packet to the discovered other network devices with an information request about the multimedia data existing at each of the other discovered network devices to collect the information about the multimedia data.

10. The network device as set forth in claim 9, wherein the collected information about the multimedia data includes identification information related to pieces of the multimedia data stored at the discovered other network devices.

11. The network device as set forth in claim 10, further comprising:
a mapping table which stores the identification information related to each piece of the multimedia data together with the identification information of the respective other network device at which the corresponding piece of the multimedia data is stored.

12. The network device as set forth in claim 11, wherein the packet generation/processing unit withdraws the identification information about the other network device, which stores the piece of the selected multimedia data, from the mapping table, and includes the withdrawn identification information into the packet transmitted to request the selected multimedia data from the other network device.

13. The network device as set forth in claim 1, wherein the other network devices comprise first through Nth network devices, each of which comprises:
a corresponding network device management unit which collects information about the multimedia data from network devices of the network, the information including identification information of the network devices at which a corresponding piece of the multimedia data is stored;
a corresponding multimedia data management unit which prepares a corresponding multimedia data list based on the collected information about the multimedia data and the information about the multimedia data which are stored on a corresponding network device and stores the multimedia data list on the corresponding network device;
a corresponding packet generation/processing unit which generates the packet requesting the multimedia data selected from the stored multimedia data list; and
a corresponding transmission unit which transmits the generated packet.

14. The network device as set forth in claim 13, wherein each of the first through Nth network devices provides a corresponding network device identification information and the information about the multimedia data stored on the corresponding network device, in response to a request transmitted by the transmission unit of one of the network devices, to the one of the network devices.

15. The network device as set forth in claim 14, wherein, when a packet requesting predetermined multimedia data from the one of the network devices is received from another one of the network devices, the one of the network devices transmits the multimedia data to the another one of the network devices.

16. The network device of claim 1, comprising at least one of a desktop computer, a notebook computer, a home theater, and a personal video recorder.

17. The network device of claim 1, wherein the network device acts as a server when requesting the selected multimedia data on the multimedia data list from the other network devices.

18. The network device as set forth in claim 17, wherein the network device acts as the client device when transmitting the multimedia data stored on the network device to one of the other network devices in response to a request for a multimedia file stored on the network device.

19. A method in which a network device stores multimedia data and shares the multimedia data with other network devices existing on a network, the method comprising:
collecting, by the network device, information about multimedia data from the other network devices, the information including identification information of the other network devices at which a corresponding piece of the multimedia data is stored;
preparing, by the network device, a multimedia data list based on the collected information about the multimedia data on the other network devices and information about the multimedia data which are stored on the network device;
generating a packet which requests selected multimedia data of the multimedia data list; and
transmitting the generated packet to at least one of the other network devices,
wherein the network device comprises a client device.

20. The method as set forth in claim 19, further comprising receiving the multimedia data which is requested from the at least one of the other network devices and playing the multimedia data that is received.

21. The method as set forth in claim 19, wherein the generating the packet requesting the selected multimedia data comprises:
determining a location where the selected multimedia data is stored;
outputting and playing the selected multimedia data if the location is within the network device which requests the selected multimedia data; and
generating a packet which requests transmission of the selected multimedia data from the at least one of the other network devices if the location is not within the network device which requests the selected multimedia data.

22. The method as set forth in claim 19, wherein the determining the location where the selected multimedia data is stored is performed with reference to a mapping table in which the multimedia data list and the information about the multimedia data are mapped to each other.

23. The method as set forth in claim 22, wherein the network device transmits multimedia data to at least one of the other network devices in response to a request for a multimedia file stored on the network device.

24. The method as set forth in claim 19, further comprising determining whether the information about the multimedia data on the other network devices varies.

25. The method as set forth in claim 19, further comprising requesting the information about the multimedia data from the other network devices in a multicast or broadcast manner.

26. The method as set forth in claim 19, wherein the network device is connected to the other network devices via the network and the selected multimedia data from at least one of the other network devices is transmitted to the network device via the network.

\* \* \* \* \*